(12) United States Patent
Olson et al.

(10) Patent No.: US 10,783,924 B2
(45) Date of Patent: Sep. 22, 2020

(54) CONTROL HEAD TO HEAD SPACING USING A PIEZOELECTRIC DEVICE

(71) Applicant: Western Digital Technologies, Inc., San Jose, CA (US)

(72) Inventors: Trevor Olson, San Jose, CA (US); Diane L. Brown, San Jose, CA (US); Cherngye Hwang, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/370,225

(22) Filed: Mar. 29, 2019

(65) Prior Publication Data
US 2019/0333536 A1 Oct. 31, 2019

Related U.S. Application Data

(60) Provisional application No. 62/663,621, filed on Apr. 27, 2018.

(51) Int. Cl.
*G11B 5/54* (2006.01)
*G11B 5/588* (2006.01)
*G11B 21/10* (2006.01)
*G11B 5/008* (2006.01)

(52) U.S. Cl.
CPC ........ *G11B 21/103* (2013.01); *G11B 5/00813* (2013.01)

(58) Field of Classification Search
CPC ... G11B 5/54; G11B 5/59633; G11B 5/59638; G11B 5/52; G11B 15/005; G11B 15/46; G11B 15/52; G11B 5/584; G11B 5/588

USPC ......... 360/70, 75, 72.3, 73, 11, 12, 74.5, 76, 360/77.11, 77.12
See application file for complete search history.

(56) References Cited

U.S. PATENT DOCUMENTS

| | | | |
|---|---|---|---|
| 5,513,051 A | * | 4/1996 | Lee .................... G11B 5/00852 360/77.16 |
| 5,726,834 A | | 3/1998 | Eckberg et al. |
| 7,221,534 B2 | | 5/2007 | Anderson et al. |
| 7,403,350 B2 | | 7/2008 | Bates et al. |
| 9,472,221 B1 | * | 10/2016 | Bui ........................ G11B 5/584 |

(Continued)

OTHER PUBLICATIONS

Lantz, Mark A . . . et al.; "Servo-Pattern Design and Track-Following Control for Nanometer Head Positioning on Flexible Tape Media" IEEE Transactions on Control; vol. 20, Issue 2; Mar. 2012 (13 pages).

(Continued)

*Primary Examiner* — Nabil Z Hindi
(74) *Attorney, Agent, or Firm* — Patterson & Sheridan, LLP; Steven H. Versteg (57) ABSTRACT

Embodiments of the present disclosure generally relate to tape drives used for magnetic recording on tapes, and more specifically to tape heads including servo and data head structures. A tape head includes a plurality of servo head structures and one or more piezoelectric devices. The one or more piezoelectric devices are utilized to control the spacing and dimensions between the plurality of servo head and data head structures. The one or more piezoelectric devices further allow the tape head to receive active feedback from the tape drive, allowing the one or more piezoelectric devices to correct any errors during operation.

20 Claims, 4 Drawing Sheets

(56) References Cited

U.S. PATENT DOCUMENTS

| | | | |
|---|---|---|---|
| 9,564,161 B1 | 2/2017 | Cherubini et al. | |
| 2002/0163752 A1* | 11/2002 | Peterson | G11B 5/584 360/76 |
| 2006/0044671 A1 | 3/2006 | Weber et al. | |
| 2006/0050428 A1* | 3/2006 | Brittenham | G11B 5/584 360/75 |
| 2009/0316296 A1 | 12/2009 | Cherubini et al. | |
| 2010/0067139 A1* | 3/2010 | Bates | G11B 5/584 360/71 |
| 2011/0255195 A1* | 10/2011 | Poorman | G11B 5/4893 360/241 |

OTHER PUBLICATIONS

Jan Jose et al.; "Characterization of Lateral Tape Motion and Disturbances in the Servo Position Error Signal of a Linear Tape Drive"; Tribology International, vol. 38, 2005 (8 pages).

* cited by examiner

CONTROL HEAD TO HEAD SPACING USING A PIEZOELECTRIC DEVICE

CROSS-REFERENCE TO RELATED APPLICATIONS

This application claims benefit of U.S. Provisional Patent Application Ser. No. 62/663,621, filed Apr. 27, 2018, which is herein incorporated by reference.

BACKGROUND OF THE DISCLOSURE

Field of the Disclosure

Embodiments of the present disclosure generally relate to tape heads used for magnetic recording on tapes, and more specifically to tape heads including servo and data head structures.

Description of the Related Art

Tape heads are used to record and readback information on tapes by magnetic processes. The tape heads use a plurality of servo heads to read servo tracks to align the heads for reading data stored on data tracks. The servo heads and data heads are typically formed using sensors disposed between two shield layers.

The tape heads may linearly expand and contract during fabrication and operation, such as from temperature changes, material stress, mechanical processing, or from dimensional variations in the tape, which causes the effective spacing between the servo heads to change. When writing on numerous data tracks at once, any mismatch in dimensions between the servo heads and servo tracks can cause misalignment of the tape heads and lead to misregistration of the data tracks. The variations in dimensions between servo heads causes a reduction of the accuracy of the tape heads, and may prevent the tape heads from reading or writing existing data tracks.

Therefore, it is desirable to provide head structures that allow the dimensions between servo heads and between data heads to be controlled.

SUMMARY OF THE DISCLOSURE

Embodiments of the present disclosure generally relate to tape drives used for magnetic recording on tapes, and more specifically to tape heads including servo and data head structures. A tape head includes a plurality of servo head structures, data head structures, and one or more piezoelectric devices. The one or more piezoelectric devices are utilized to control the spacing and dimensions between the plurality of servo head and data head structures. The one or more piezoelectric devices further allow the tape head to receive active feedback from the tape drive, allowing the one or more piezoelectric devices to correct any errors during operation.

In one embodiment, a tape head comprises: an array of servo head structures and data head structures; and one or more piezoelectric devices coupled near the array.

In another embodiment, a tape drive comprises: a tape head having one or more piezoelectric devices; and a controller coupled to the tape head, wherein the controller is configured to receive a signal from a servo head structure and provide a voltage to the one or more piezoelectric devices in response to the signal.

In another embodiment, a tape drive comprises a tape head including: a plurality of servo head structures; and means to maintain constant dimensions between the servo head structures. The tape drive also comprises means to control expansion and contraction of the means to maintain constant dimensions, wherein the means to control expansion and contraction is coupled to the tape head.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Embodiments of the present disclosure generally relate to tape drives used for magnetic recording on tapes, and more specifically to tape heads including servo and data head structures. A tape head includes a plurality of servo head structures, data head structures, and one or more piezoelectric devices. The one or more piezoelectric devices are utilized to control the spacing and dimensions between the plurality of servo head and data head structures. The one or more piezoelectric devices further allow the tape head to receive active feedback from the tape drive, allowing the one or more piezoelectric devices to correct any errors during operation.

Figure 1:
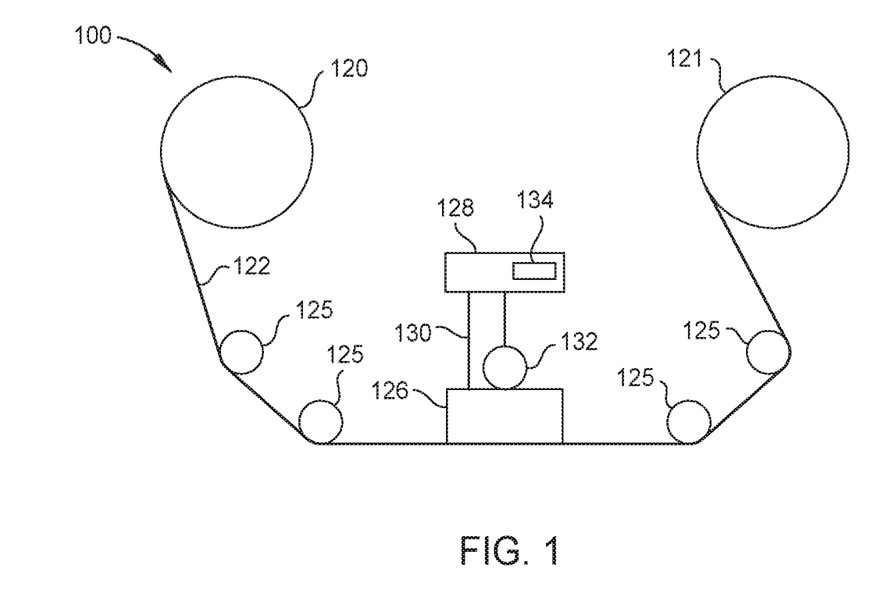
FIG. 1 is a schematic illustration of a tape drive according to one embodiment disclosed herein.

FIG. 1 is a schematic illustration of a tape drive 100 according to one embodiment disclosed herein. While one specific implementation of a tape drive is shown in FIG. 1, it should be noted that the embodiments describe herein may be implemented in the context of any type of tape drive system.

As shown, a tape supply cartridge 120 and a take-up reel 121 are provided to support a tape 122. One or more of the reels 121 may form a part of a removable cartridge and are not necessarily part of the tape drive 100. The tape drive, such as that illustrated in FIG. 1, may further include drive motor(s) (not shown) to drive the tape supply cartridge 120 and the take-up reel 121 to move the tape 122 over a tape head 126 of any type. Such head may include an array of data heads and servo heads (not shown in FIG. 1).

Guides 125 guide the tape 122 across the tape head 126 via a cable 130. The controller 128 typically controls head functions such as servo following, writing, reading, etc. The controller may operate under logic known in the art, as well as any logic disclosed herein. The cable 130 may include read/write circuits to transmit data to the head 126 to be recorded on the tape 122 and to receive data read by the head 126 from the tape 122. An actuator 132 controls the position of the head 126 relative to the tape 122.

An interface 134 may also be provided for communication between the tape drive and the host (integral or external) to send and receive the data and for controlling the operation of the tape drive and communicating the status of the tape drive to the host, as will be understood by those of skill in the art.

Figure 2:
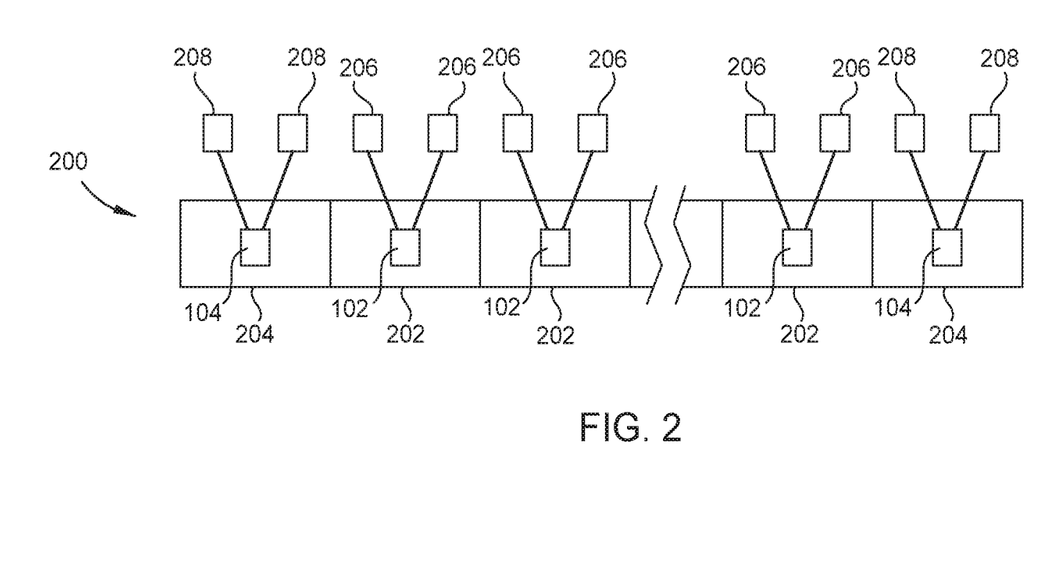
FIG. 2 is a schematic illustration of a tape head including two servo head structures and a plurality of data head structures according to one embodiment disclosed herein.

FIG. 2 is a schematic illustration of a tape head 200 including two servo head structures 204 and a plurality of data head structures 202 according to one embodiment disclosed herein. The tape head 200 may be the tape head 126 shown in FIG. 1. As shown in FIG. 2, the tape head 200 includes the plurality of data head structures 202 bounded by two servo head structures 204. In one embodiment, the plurality of data head structures 202 includes 33 data head structures 202. Additionally, a plurality of servo head structures 204 may be present with one or more data head structures 202 disposed between each of the servo head structures 204. Each of the plurality of servo head structures 204 may be spaced equidistant apart. For example, each servo head structure 204 may be spaced about 2.859 mm apart. In one embodiment, up to 32 servo head structures 204 may be present.

Each data head structure 202 includes the sensor 102, and each servo head structure 204 includes the sensor 104. Each sensor 104 of the servo head structure 204 is electrically coupled to two bonding pads 208, and each sensor 102 of the data head structure 202 is electrically coupled to two bonding pads 206. In one embodiment, there are four bonding pads 208 and 66 bonding pads 206.

Figure 3:
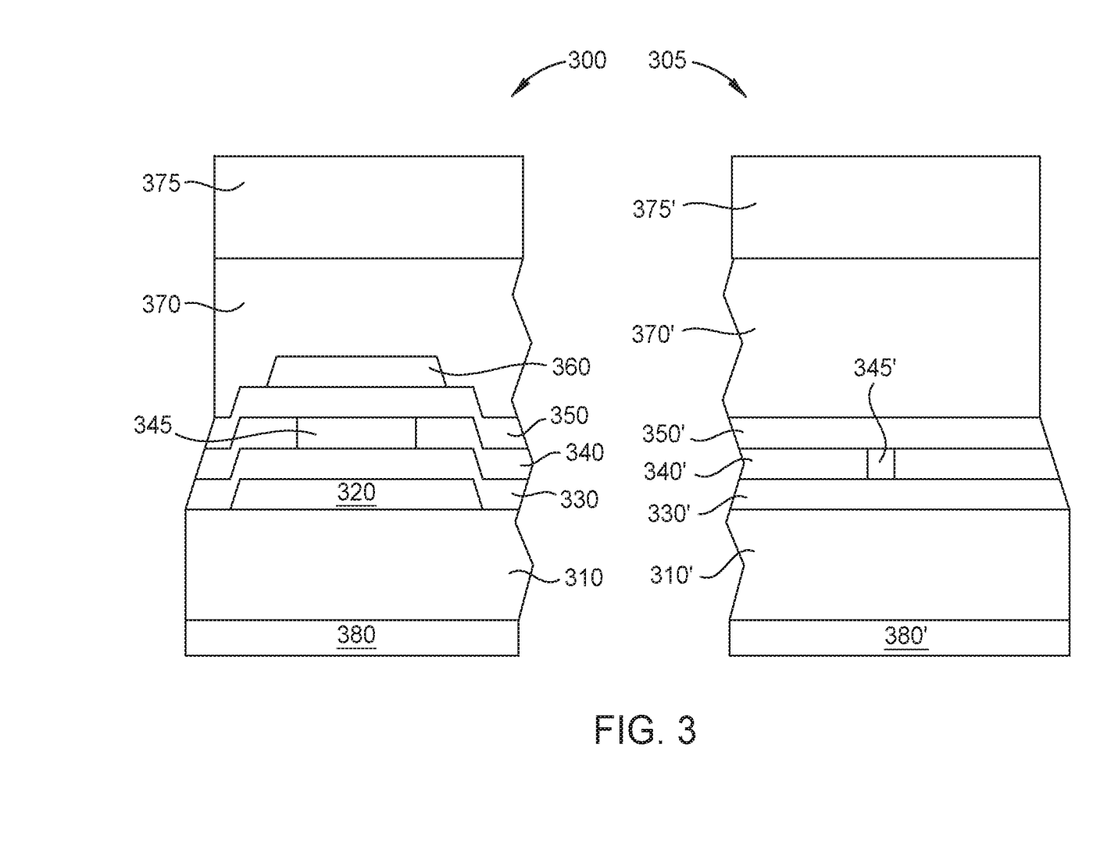
FIG. 3 is a cross sectional media facing surface view of a servo head structure and a data head structure according to one embodiment disclosed herein.

FIG. 3 is a cross sectional media facing surface (MFS) view of a servo head structure 300 and a data head structure 305 according to one embodiment disclosed herein. As shown in FIG. 3, the servo head structure 300 and the data head structure 305 are formed on a substrate surface in a spaced apart relationship according to one embodiment. The servo head structure 300 and the data head structure 305 may be part of the tape head 126 shown in FIG. 1. It is to be understood that while only one servo head structure 300 and one data head structure 305 are shown, a tape head, such as the tape head 126 shown in FIG. 1, may have multiple servo head structures 300 and multiple data head structures 305. For example, an array of up to 33 data head structures 305 may be present and bounded by two servo head structures 300. In another embodiment, up to 32 servo head structures 300 may be present. Other combinations of data head structures 305 and servo head structures 300 are contemplated as well. The servo head structure 300 may be the servo head structure 204 shown in FIG. 2, and the data head structure 305 may be the data head structure 202 shown in FIG. 2.

As shown in FIG. 3, the servo head structure 300 includes a first substrate 380, a first shield layer 310, a first gap layer 320 disposed on the first shield layer 310, a second gap layer 330 disposed on the first gap layer 320 and any exposed portion of the first shield layer 310, a dielectric layer 340 disposed on the second gap layer 330 with a sensor 345 formed through the dielectric layer 340, a third gap layer 350 disposed on the dielectric layer 340 and the sensor 345, a fourth gap layer 360 disposed on the third gap layer 350, a second shield layer 370 disposed on the fourth gap layer 360 and any exposed portions of the third gap layer 350, and a second substrate 375. It is to be understood that both the first substrate 380 and the second substrate 370 are not to be limited to a single layer, but rather, is to be understood to represent one or more layers that are collectively referred to as a "substrate". Additionally, the first and second substrates 380, 370 are conductive. In one embodiment, the servo head 300 may include a piezoelectric device (not shown) disposed between the first shield layer 310 and the second shield layer 370.

The data head structure 305 is formed concurrently with the servo head structure 300 and includes several layers in common, which are marked with the related material layer deposition. For example, the first gap layer 330' of the data head structure 305 corresponds to the second gap layer 330 of the servo head structure 300.

The data head structure 305 includes first substrate 380', a first shield layer 310', a first gap layer 330' conformally disposed on the first shield layer 310', a dielectric layer 340' disposed on the first gap layer 330' with a sensor 345' formed through the dielectric layer 340', a second gap layer 350' conformally disposed on the dielectric layer 340' and the sensor 345', a second shield layer 370' disposed on the second gap layer 350', and a second substrate 370'. As shown in FIG. 3, the sensor 345 of the servo head structure 300 has a greater track width than the sensor 345' of the data head structure 305. It is to be understood that both the first substrate 380' and the second substrate 370' are not to be limited to a single layer, but rather, is to be understood to represent one or more layers that are collectively referred to as a "substrate". Additionally, the first and second substrates 380', 370' are conductive.

The first and second shield layers 310, 310', 370, 370' are each formed by an electrodeposition process, such as electroplating or electroless deposition. The first and second shield layers 310, 310', 370, 370' each comprise a magnetic material selected from the group consisting of nickel iron alloy, cobalt iron alloy, cobalt nickel iron alloy, and combinations thereof. A nickel iron alloy of 80 atomic percent nickel and 20 atomic percent iron may be used as the first and second shield layer material. The first shield layer 310, 310' may be formed on or in a substrate surface material of alumina ($Al_2O_3$) or any other suitable material.

The gap layers 320, 330, 330', 350, 350', 360 each comprise a non-magnetic material selected from the group consisting of iridium, an alloy of nickel and chromium, tantalum, and combinations thereof. The gap layers 320, 330, 330', 350, 350', 360 may be deposited by a PVD or sputtering process and two or more of the deposition processes may be performed in the same chamber or same processing tool. After each layer is deposited, the layer may be patterned utilizing milling or photolithographic processing.

The gap layers 320, 330, 330', 350, 350', 360 may be each deposited at a thickness from about 10 nm to about 90 nm (nanometers), however, any thickness may be used based on the desired gap distances and sizes of the respective head structures for the tape heads. For example, the first gap layer 320 may comprise 80 nm of NiCr alloy or CrIr alloy, the second gap layer 330, 330' of 45 nm of NiCr alloy or CrIr alloy, the third gap layer 350, 350' of 45 nm NiCr alloy or CrIr alloy, and the fourth gap layer 360 may be deposited 80 nm of NiCr alloy or CrIr alloy.

The dielectric layer 340, 340' may also be deposited by a PVD or sputtering process and may be performed in the same chamber or same processing tool with the one or more gap layer deposition processes. The dielectric layer 340, 340' may comprise a suitable dielectric material, such as a dielectric material selected from the group of aluminum oxide, silicon oxide, silicon nitride, and combinations thereof.

The first and second shield layers 310, 310', 370, 370' may be spaced apart by the gap layers. The servo head structure 300 has a greater spacing between shield layers 310, 370 than the data head structure 305 in the embodiment of FIG. 3.

Figure 4:
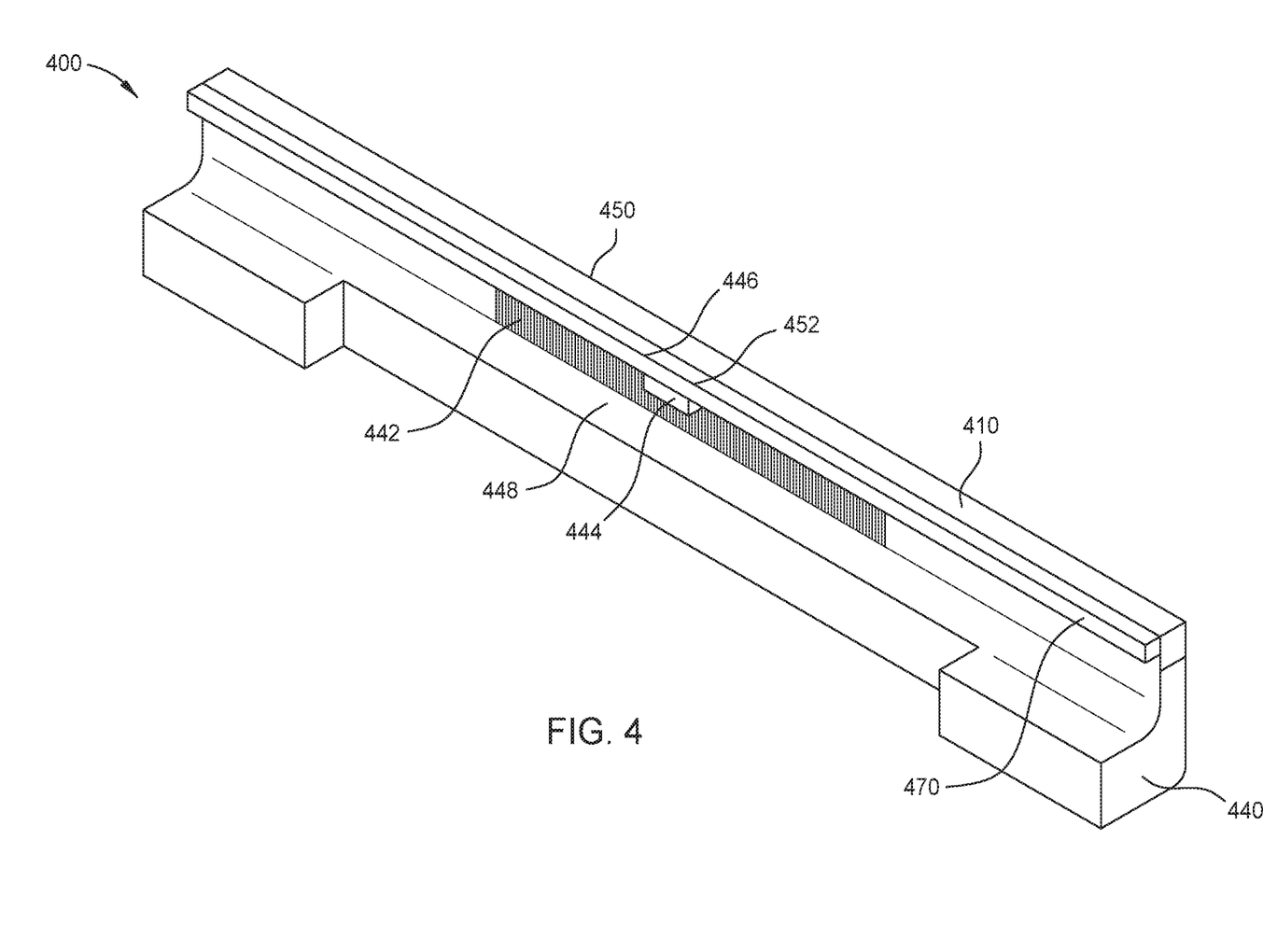
FIG. 4 illustrates a schematic tape head of a tape drive having one or more piezoelectric devices, according to one embodiment.

FIG. 4 illustrates a schematic tape head 400 of a tape drive having one or more piezoelectric devices, according to one embodiment. The tape head 400 may be the tape head 126 shown in FIG. 1, or the tape head 200 as shown in FIG. 2.

The tape head 400 comprises a u-beam 440 coupled to a first substrate 410 and a second substrate 470. An array 442 comprising a plurality of servo head structures and data head structures is coupled to the u-beam 440 and disposed between the first substrate 410 and the second substrate 470. The array 442 may comprise a plurality of read data head structures and servo head structures, a plurality of write data head structures and servo head structures, or a plurality of read data head structures, write data head structures, and servo head structures. The plurality of servo head structures and data head structures of the array 442 may be servo head structures 204 and data head structures 202 of FIG. 2, or servo head structures 300 and data head structures 305 of FIG. 3. In one embodiment, the tape head 400 is a 64 channel tape head having up to 66 data head structures in addition to servo head structures.

One or more piezoelectric devices 444 are coupled near the array 442 to control the spacing between the plurality of servo head or data head structures of the array 442, and to receive active feedback from the tape drive. During operation of the tape head 400 of a tape drive, a servo signal is generated from each of the servo head structures of the array 442. If a controller, such as controller 128 of FIG. 1, receives a servo signal indicating a servo head structure is misaligned or that there is a dimensional variation in the tape, the one or more piezoelectric devices 444 can be utilized to correct the positioning of the misaligned servo head structure, preventing any errors from occurring. By utilizing the piezoelectric devices 444, the tape drive can correct for differences in dimensions from the tape, and the tape drive can maintain constant dimensions between servo head structures of the array 442.

Moreover, utilizing one or more piezoelectric devices 444 allows for the overall expansion or contraction of the tape head 400 to be controlled. For example, the one or more piezoelectric devices 444 may be one piezoelectric device 444 that extends the entire length of the array 442. In such an embodiment, a constant voltage is applied to the entire length of the piezoelectric device 444 to control the spacing of the servo head structures of the array 442, ensuring each servo head structure of the array 442 maintains separation of a constant distance.

In another embodiment, each of the plurality of servo head structures of the array 442 is coupled to an individual piezoelectric device 444. In such an embodiment, a constant voltage or single signal is applied to each piezoelectric device 444 such that each piezoelectric device 444 receives the same voltage. Applying the same voltage to each piezoelectric device 444 allows for the tape head 400 to control the spacing of the servo head structures of the array 442 and ensures each servo head structure of the array 442 maintains spacing at a constant distance. In yet another embodiment, a series of piezoelectric devices 444 are utilized, and a single signal is applied to the entire series of piezoelectric devices 444 to apply the same voltage to each device of the series. Utilizing one or more piezoelectric devices 444 to ensure servo head structures of the array 442 remain a constant distance apart results in the overall expansion or contraction of the tape head 400 being controlled.

As show in FIG. 4, the one or more piezoelectric devices 444 may be disposed in front of the array 442. In one embodiment, the one or more piezoelectric devices 444 are disposed behind the array 442 between the first substrate 410 and the second substrate 470, as shown at location 446. In another embodiment, the one or more piezoelectric devices 444 are coupled to the u-beam 440, as shown at location 448. The one or more piezoelectric devices 444 may be embedded within the u-beam 440. In yet another embodiment, the one or more piezoelectric devices 444 may be disposed behind the array 442 on the backside of the u-beam 440, as shown at location 450. In another embodiment, the one or more piezoelectric devices 444 may be disposed above the array 442, as shown at location 452. The location of the one or more piezoelectric devices 444 are not limited to the locations discussed. For example, one or more piezoelectric devices 444 may be utilized at one or more locations on the tape head 400 simultaneously.

Utilizing one or more piezoelectric devices in a tape head allows for the tape head to control the spacing and dimensions between the plurality of servo heads to ensure the separation of each of the plurality of servo heads is maintained equidistant. Additionally, the one or more piezoelectric devices allow the tape head to receive active feedback from the tape drive during operation, and further allow the one or more piezoelectric devices to correct and compensate for any errors, such as temperature changes or variations in the tape. By using the one or more piezoelectric devices to ensure the plurality of servo heads and data heads are spaced a constant distance apart, the accuracy and ability of reading and writing data tracks is improved.

In one embodiment, a tape head, comprises: an array of servo head structures and data head structures; and one or more piezoelectric devices coupled near the array. The array comprises: a plurality of data head structures; and a plurality of servo head structures. The one or more piezoelectric devices comprises a plurality of piezoelectric devices. Each servo head structure of the plurality of servo head structures is coupled to an individual piezoelectric device. The one or more piezoelectric devices is embedded within a u-beam. The one or more piezoelectric devices extends for an entire length of the array. The one or more piezoelectric devices is disposed in front of the array. The one or more piezoelectric devices is disposed above a first substrate or below a second substrate. The one or more piezoelectric devices is disposed behind the array o. The one or more piezoelectric devices is disposed above the array.

In another embodiment, a tape drive, comprises: a tape head having one or more piezoelectric devices; and a controller coupled to the tape head, wherein the controller is configured to receive a signal from a servo head structure and provide a voltage to the one or more piezoelectric devices in response to the signal. The one or more piezoelectric devices comprises a plurality of piezoelectric devices and wherein the controller is capable of delivering the same voltage to each piezoelectric device. Each piezoelectric device is coupled to a corresponding a servo head structure. The one or more piezoelectric device is one piezoelectric device, wherein the tape head includes an array of servo head structures and data head structures, and wherein the one piezoelectric device extends for an entire length of the array. The controller is configured to deliver a constant voltage to an entire length of the piezoelectric device. The one or more piezoelectric devices comprises a series of piezoelectric devices and wherein the controller is configured to deliver a single signal to the series of piezoelectric devices and apply the same voltage to each piezoelectric device of the series.

In another embodiment, a tape drive, comprises a tape head including: a plurality of servo head structures; and means to maintain constant dimensions between the servo head structures. The tape drive also comprises means to control expansion and contraction of the means to maintain constant dimensions, wherein the means to control expansion and contraction is coupled to the tape head. The means to maintain constant dimensions is coupled to the means to control expansion and contract. The tape drive further comprises means to receive a servo signal indicating a servo head structure is misaligned. The tape drive further comprises means to receive a servo signal indicating a dimensional variation in a tape.

While the foregoing is directed to embodiments of the present disclosure, other and further embodiments of the disclosure may be devised without departing from the basic scope thereof, and the scope thereof is determined by the claims that follow.

What is claimed is:

1. A tape head, comprising:
a u-beam structure;
an array of servo head structures and data head structures coupled to the u-beam structure; and
one or more piezoelectric devices coupled near the array, wherein the one or more piezoelectric devices is embedded within the u-beam structure, and wherein the one or more piezoelectric devices are configured to control the spacing between each servo head structure and data head structure of the array.

2. The tape head of claim 1, wherein the array comprises:
a plurality of data head structures; and
a plurality of servo head structures.

3. The tape head of claim 2, wherein the one or more piezoelectric devices comprises a plurality of piezoelectric devices.

4. The tape head of claim 3, wherein each servo head structure of the plurality of servo head structures is coupled to an individual piezoelectric device.

5. The tape head of claim 1, wherein the one or more piezoelectric devices is one piezoelectric device that extends an entire length of the array.

6. A tape drive, comprising:
a tape head having a plurality of piezoelectric devices; and
a controller coupled to the tape head, wherein the controller is configured to receive a signal from a servo head structure and provide a voltage to the plurality of piezoelectric devices in response to the signal, and wherein the controller is capable of delivering the same voltage to each piezoelectric device.

7. The tape drive of claim 6, wherein each piezoelectric device is coupled to a corresponding a servo head structure.

8. The tape drive of claim 6, wherein the one or more piezoelectric device is one piezoelectric device, wherein the tape head includes an array of servo head structures and data head structures, and wherein the one piezoelectric device extends for an entire length of the array.

9. The tape drive of claim 8, wherein the controller further is configured to deliver a constant voltage to an entire length of the piezoelectric device.

10. The tape drive of claim 6, wherein the plurality of piezoelectric devices comprises a series of piezoelectric devices and wherein the controller is further configured to deliver a single signal to the series of piezoelectric devices and apply the same voltage to each piezoelectric device of the series.

11. A tape drive, comprising:
a tape head comprising:
a u-beam structure;
a plurality of servo head structures coupled to the u-beam structure;
means to maintain constant dimensions between the servo head structures; and
means to control expansion and contraction of the means to maintain constant dimensions, wherein the means to control expansion and contraction and the means to maintain constant dimensions between the servo head structures are embedded within the u-beam structure of the tape head.

12. The tape drive of claim 11, wherein the means to maintain constant dimensions is coupled to the means to control expansion and contract.

13. The tape drive of claim 11, further comprising means to receive a servo signal indicating a servo head structure is misaligned.

14. The tape drive of claim 11, further comprising means to receive a servo signal indicating a dimensional variation in a tape.

15. A tape drive, comprising:
a tape head comprising a series of piezoelectric devices; and
a controller coupled to the tape head, wherein the controller is configured to receive a signal from a servo head structure and provide a voltage to the series of piezoelectric devices in response to the signal, wherein the controller is further configured to deliver a single signal to the series of piezoelectric devices and apply the same voltage to each piezoelectric device of the series.

16. The tape head of claim 1, further comprising a controller coupled to the tape head, wherein the one or more piezoelectric devices comprises a series of piezoelectric devices, and wherein the controller is configured to deliver a single signal to the series of piezoelectric devices and apply the same voltage to each piezoelectric device of the series.

17. The tape head of claim 1, further comprising a first substrate and a second substrate coupled to the u-beam structure, the array being coupled to the u-beam structure between the first substrate and the second substrate, wherein the one or more piezoelectric devices is disposed above the first substrate or below the second substrate.

18. The tape head of claim 1, wherein the array is coupled to a first surface of the u-beam structure and the one or more piezoelectric devices is disposed behind the array on a second surface of the u-beam structure, the first surface of the u-beam structure being a front side and the second surface of the u-beam structure being a backside.

19. A tape drive comprising the tape head of claim 1.

20. The tape head of claim 1, wherein the one or more piezoelectric devices are further configured to receive a servo signal indicating a servo head structure of the array is misaligned and to receive a servo signal indicating a dimensional variation in a tape.

* * * * *